(12) United States Patent
Kats et al.

(10) Patent No.: US 10,791,304 B2
(45) Date of Patent: Sep. 29, 2020

(54) APPARATUS FOR AUGMENTING HUMAN VISION

(71) Applicant: Wisconsin Alumni Research Foundation, Madison, WI (US)

(72) Inventors: Mikhail A. Kats, Madison, WI (US); Bradley Gundlach, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 156 days.

(21) Appl. No.: 15/668,210

(22) Filed: Aug. 3, 2017

(65) Prior Publication Data

US 2018/0041737 A1 Feb. 8, 2018

Related U.S. Application Data

(60) Provisional application No. 62/371,515, filed on Aug. 5, 2016.

(51) Int. Cl.
| | |
|---|---|
| *H04N 9/083* | (2006.01) |
| *H04N 9/64* | (2006.01) |
| *G02B 27/01* | (2006.01) |
| *G02C 7/10* | (2006.01) |
| *H04N 9/73* | (2006.01) |
| *H04N 9/04* | (2006.01) |
| *H04N 5/33* | (2006.01) |

(52) U.S. Cl.
CPC ......... *H04N 9/083* (2013.01); *G02B 27/0172* (2013.01); *G02C 7/104* (2013.01); *G02C 7/105* (2013.01); *H04N 9/045* (2013.01); *H04N 9/64* (2013.01); *H04N 9/643* (2013.01); *H04N 9/73* (2013.01); *G02B 2027/014* (2013.01); *G02B 2027/0112* (2013.01); *G02B 2027/0138* (2013.01); *G02B 2027/0178* (2013.01); *H04N 5/332* (2013.01)

(58) Field of Classification Search
CPC .......... H04N 9/083; H04N 9/83; H04N 9/045; H04N 9/45; H04N 9/64; H04N 9/643; H04N 9/73; H04N 5/332; G02B 27/0172; G02B 27/172; G02B 2027/0112; G02B 2027/0138; G02B 2027/014; G02B 2027/0175; G02C 7/104; G02C 7/105
USPC .......................................................... 348/33
See application file for complete search history.

(56) References Cited

U.S. PATENT DOCUMENTS

| | | | |
|---|---|---|---|
| 5,218,386 A | 6/1993 | Levien | |
| 5,408,278 A | 4/1995 | Christman | |
| 6,597,807 B1 * | 7/2003 | Watkins | G06T 5/50 |
| | | | 382/164 |
| 7,554,586 B1 * | 6/2009 | Imai | G01J 3/36 |
| | | | 348/269 |
| 7,784,939 B2 | 8/2010 | Negishi | |
| 7,959,295 B2 | 6/2011 | Richards et al. | |
| 8,692,912 B2 | 4/2014 | Fish et al. | |

(Continued)

*Primary Examiner* — Joseph G Ustaris
*Assistant Examiner* — Jimmy S Lee
(74) *Attorney, Agent, or Firm* — Boyle Fredrickson, S.C.

(57) ABSTRACT

The functional effect of having additional color-sensing cone types in the human eye is implemented by an encoding of some spectral information differently for the left and right eyes. This different encoding for identical features seen by the left and right eyes is interpreted as a perceptively different feature by the human brain, allowing additional spectral information to be conveyed through the limited tristimulus sensitivity of the human eye.

20 Claims, 6 Drawing Sheets

(56) References Cited

U.S. PATENT DOCUMENTS

| | | | |
|---|---|---|---|
| 2010/0060857 A1 | 3/2010 | Richards et al. | |
| 2010/0091200 A1* | 4/2010 | Vigouroux | H04N 9/3155 348/756 |
| 2010/0149483 A1* | 6/2010 | Chiavetta, III | G02B 5/289 351/159.63 |
| 2012/0212487 A1* | 8/2012 | Basler | H04N 13/356 345/419 |
| 2013/0250235 A1* | 9/2013 | Foulds | F21V 9/08 351/159.65 |
| 2014/0233105 A1 | 8/2014 | Schmeder et al. | |
| 2015/0346493 A1* | 12/2015 | Choi | G02B 5/04 359/631 |
| 2016/0042522 A1* | 2/2016 | Wajs | G06T 7/586 348/335 |
| 2016/0224833 A1* | 8/2016 | Jin | G06T 7/246 |
| 2016/0314564 A1* | 10/2016 | Jones | G06T 3/0093 |

\* cited by examiner

APPARATUS FOR AUGMENTING HUMAN VISION

CROSS REFERENCE TO RELATED APPLICATION

This application claims the benefit of U.S. provisional application 62/371,515 filed Aug. 5, 2016 and hereby incorporated by reference

STATEMENT REGARDING FEDERALLY SPONSORED RESEARCH OR DEVELOPMENT

- -

BACKGROUND OF THE INVENTION

The present invention relates to an apparatus for augmenting human vision and in particular, to an apparatus that increases the spectral sensitivity of human vision.

Human color vision generally relies on photoreceptor "cone" cells containing photopigments with various frequency-dependent sensitivities. The degree of color perception is determined to a significant extent by the number of different cone cell types in the eye (i.e., cone cells having different photopigments), and their frequency sensitivity.

The typical human eye has three cone cell types, which together are sensitive to wavelengths between approximately 390 to 700 nm. By comparison, many birds, such as the plum-headed finch, have four cone cell types, and are sensitive to both the visible and a portion of the ultraviolet (UV) spectrum. In an extreme example, the mantis shrimp (Odontodactylus scyllarus) has 16 types of cone cell types, eleven of which are responsible for color vision. The mantis shrimp eyes are sensitive across the entire visible range along with portions of the ultraviolet (UV) and infrared (IR).

In typical, healthy humans, the three cone types (called S, M, and L) are sensitive to approximately 360-530 nm, 400-670 nm, and 400-700 nm, and very roughly correspond to blue, green, and red, respectively. These cone responses can be thought of as compressing the complete spectral information into just three values (the so-called "LMS tristimulus values" henceforth also "tristimulus values") by integrating across the sensitivity of each cone, respectively, which are then interpreted by the brain. The tristimulus values do not uniquely describe the actual spectrum, and there exist many spectra that resolve to the same three cone responses and thus are perceived as the same color. The mapping of different spectra to the same tristimulus values is known as metamerism, and means that, in some cases, objects that have different reflection/transmission/emission spectra appear to be the same color.

The limited number of cone cell types in the human eye increases the visual limitations linked to metamerism compared to organisms with more cone cell types, and reflects an underlying limitation of the ability to discern spectral information. Improved spectral discrimination can be useful in a variety of applications, for example, in agriculture to assist in assessing plant health, or in surveillance to help distinguish camouflage from background terrain or foliage.

Currently, hyperspectral or multispectral cameras can be used to provide higher resolution sampling of light spectra for improved spectral discrimination. Such cameras can also provide a greater frequency range of light sensitivity, for example, into the infrared and ultraviolet. The ability to display or otherwise present data collected using hyperspectral or multispectral camera systems is also hampered by the fundamental limitations of the human eye with respect to spectral sensitivity as described above. Normally the limitations of the human eye are addressed by adding "false color" to a normal three-color image perceivable by the human eye. These false colors can "overload" existing colors in the image, and thus obscure other image data. For example, ultraviolet data mapped as blue into a standard three-color image conceals any underlying blue image information, revealing the inherent limitation of the human visual system to convey multi-spectral information. Hyperspectral or multispectral camera systems are relatively complex and expensive, and require power sources and digital logic, limiting their practicality for many tasks.

SUMMARY OF THE INVENTION

The present inventors have developed a system that maps spectral ranges not only to different cone types but also to different eyes. Although the inventors do not wish to be bound by a particular theory, it is currently believed that the brain, receiving different tristimulus values through two different eyes or in rapid succession in a single eye perceives a new "meta-color" distinguishable from colors perceived when those same tristimulus values are mapped identically to both eyes. These meta-colors thus convey additional color space information to the brain without obscuring or blocking existing color information.

Specifically, the present invention in one embodiment provides a vision augmentation system having a first eyepiece providing a first representation of an image having spatially varying spectral characteristics to a viewer, the first representation presenting spatially varying LMS tristimulus values being a first function of the spatially varying spectral characteristics. A second eyepiece provides a second representation of the spatially varying spectral characteristics to the viewer, the second representation presenting corresponding spatially varying LMS tristimulus values being a second function of the spatially varying spectral characteristics.

The first and second representations also present to both a left and right eye of the viewer at least one spatially varying LMS tristimulus value that share a substantially identical function of the spatially varying spectral characteristics.

It is thus a feature of at least one embodiment of the invention to encode additional spectral information into the three LMS tristimulus channels of the human eye by encoding additional color information into the pathways of the visual system of the eyes. By combining two different three-color images, either in space or time, an additional meta-color can be effected.

The first eyepiece may be positionable in front of a viewer's first eye and the second eyepiece is positioned in front of a viewer's second eye.

It is thus a feature of at least one embodiment of the invention to take advantage of the redundancy of data in binocular vision to encode additional data by varying a portion of that redundant data.

The first eyepiece may be positioned in front of a first portion of a field of view of a viewer's eye and the second eyepiece positionable in front of a second portion of the field of view of the viewer's eye.

It is thus a feature of different embodiments of the invention to provide an alternative configuration useful for monocular applications or situations where additional encoding may be desired (for example by changing the image with time) or wherein different visual fields require different encodings.

The first and second functions may provide different eyes with different stimuli to different frequencies within two ranges of a frequency band of one cone type in a human eye.

It is thus a feature of at least one embodiment of the invention to partition the sensitivity of an individual human cone type into multiple frequency bands allowing otherwise metameric colors to be separated visually.

The first and second functions may be selected to provide similar color perception of at least one of daylight and incandescent light.

It is thus a feature of at least one embodiment of the invention to reduce certain differences between the information received by the left and right eye to minimize processing conflicts by the human brain.

The first and second eyepiece may be optical filters.

It is thus a feature of at least one embodiment of the invention to provide a simple and low-cost system that can be fit into standard glasses frames without complex electronics, cameras, or power supplies.

The first filter may preferentially pass a lower half of one frequency band of one cone type and the second filter preferentially passes an upper half of the frequency band of the one cone type. In one embodiment, the one cone type may be an S cone.

It is thus a feature of at least one embodiment of the invention to generate meta-colors by effectively splitting the sensitivity of existing cones in the eye.

The first filter and second filter may unequally partition one or more frequency bands of multiple cone types.

It is thus a feature of at least one embodiment of the invention to provide an ability to provide spectral discrimination with respect to one cone type while adjusting color balance by modification of the light received by other cones.

These particular objects and advantages may apply to only some embodiments falling within the claims and thus do not define the scope of the invention.

DETAILED DESCRIPTION OF THE PREFERRED EMBODIMENT

Figure 1:
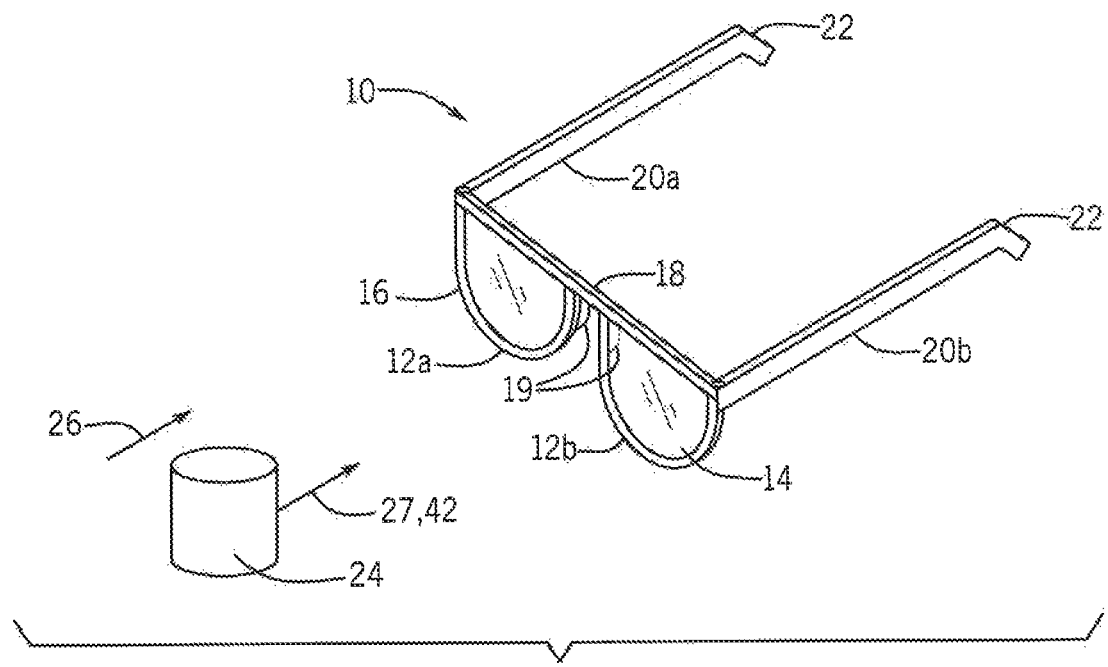
FIG. 1 is a perspective view of glasses frame holding filters suitable for use with a first embodiment of the present invention.

Referring now to FIG. 1, in one embodiment, the present invention may provide for a glasses frame 10 of conventional design providing lens rims 12a and 12b holding corresponding filters 14 and 16 to be positioned in front of a wearer's left and right eye respectively. The filters 14 and 16 may be incorporated into prescription lenses, for example, providing for eyesight correction or magnification.

The lens rims 12 may be joined by a bridge 18 and may support inwardly facing nose pads 19 to provide support on the user's nose. Temples 20a and 20b extend rearwardly from the outer edges of the rims 12 to earpieces 22, the latter supported on the user's ears as is generally understood in the art.

Generally, and as will be discussed below, the filters 14 and 16 have different spectral transmission characteristics so as to provide different spectra from the same spot in the user's visual field to the user's left and right eyes such as simulates the existence of additional cone colors beyond the normal S, M, and L cones when an illuminated object 24 is viewed through the filters 14 and 16.

Figure 2:
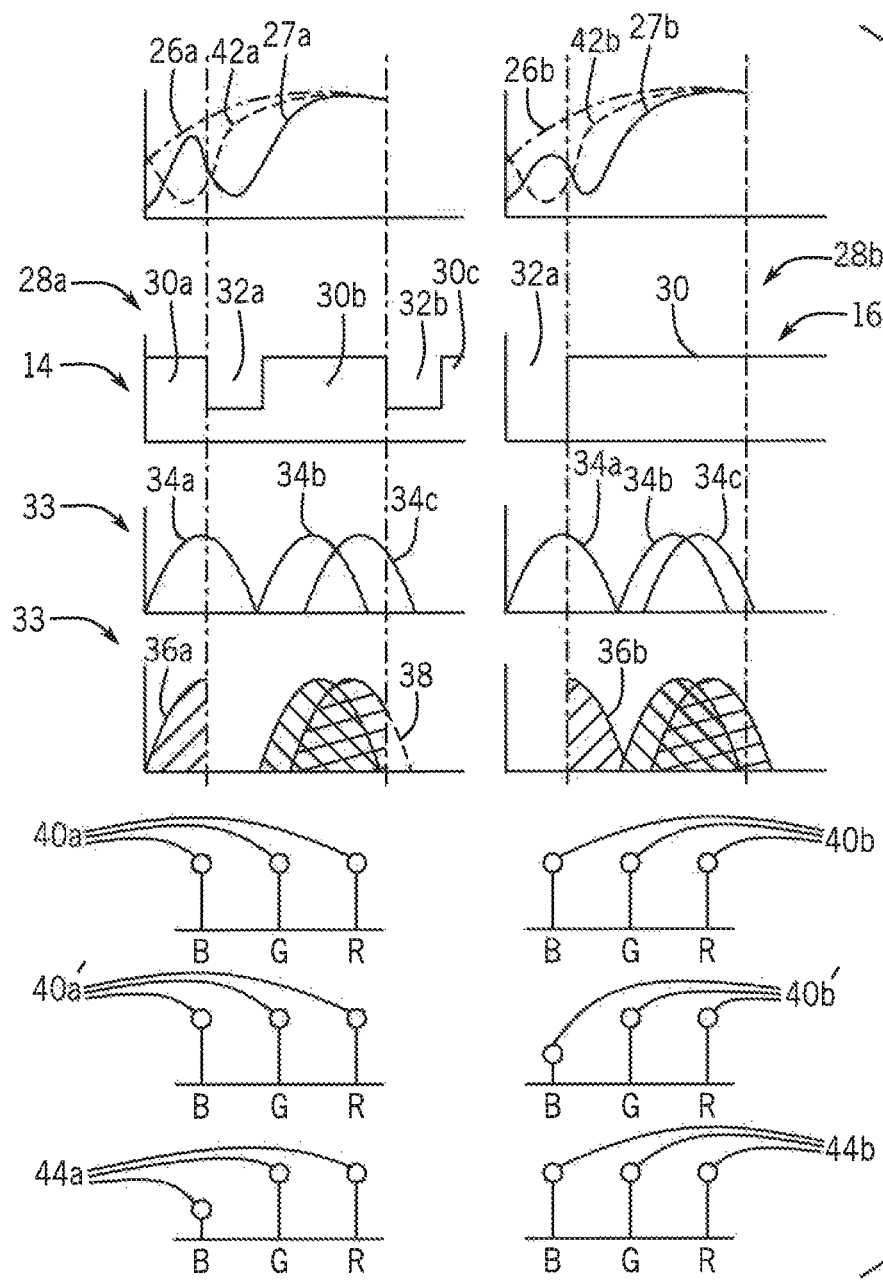
FIG. 2 is a diagrammatic representation of a light spectrum, for example, from various points in an image, as the light passes through the filters of FIG. 1 and is further processed by the eye to produce a perceived color.

Referring now also to FIG. 2, a visual background and each point on an illuminated object 24 may transmit to each respective filter 14 and 16 different an image having spatially varying spectral characteristics, the variations depending on the optical properties of that point (e.g., color) and the illumination conditions. These different spectra may include, for example, a broadband background spatially varying spectrum 26 (in this example being substantially white), a first image spectrum 27 comprised of a set of spectra for each point in the image carried by light reflected, refracted, or transmitted from the object 24 and a second image spectrum 42 from light reflected, refracted, or transmitted from the object 24, this latter spectrum 42, for example being a metamer of spectrum 27. Each of these spectra 26, 27, and 42 are denoted in the figure as "a" (e.g. 26a) as received by the left eye and "b" (e.g. 26b) as received by the right eye but are otherwise identical. As depicted for the purposes of explanation, only a single example point spectrum is shown.

An example of the processing of broadband spectra 26 will be described first. This broadband light will be received by filters 14 and 16 which each have a different transmission characteristic 28a and 28b. Ideally, the transmission characteristics 28a and 28b provide different passbands 30 through which light within the frequency range of the passbands 30 passes and stopbands 32 blocking the passage of light within the frequency range of the stopband 32. Generally, the stopbands 32 need not provide full attenuation of the light and, in fact, a partial attenuation for example less than 80 percent may be sufficient. This ability to accommodate partial attenuation in the filters 14 and 16 distinguishes them from filter glasses used for 3-D visualizations where any light transmission in the stopbands 32 creates cross talk interfering with the 3-D perception. Typically, however, the stopband 32 may provide for transmission of 0.6 or lower.

Filter 14 may have a low pass region 30a of the passbands 30, for example, extending up to about 450 nanometers followed by a stopband 32a extending from 450 nanometers to approximately 500 nanometers, followed by a passband region 30*b* extending from 500 nanometers to approximately 650 nanometers, and a second stopband 32*b* extending from 650 nanometers to approximately 700 nanometers and a third passband region 30*c* extending beyond 700 nanometers.

The second filter may have a first stopband 32*a* extending to 450 nanometers and then a single passband 30 extending from 450 nanometers beyond 800 nanometers.

The human eye provides a spectral sensitivity characteristic 33 defining sensitivity to light at different frequencies and being roughly identical for each eye. This spectral sensitivity characteristic 33 is composed of cone frequency bands 34*a*-34*c* corresponding to the sensitivity of the S, M, L cones, correspondingly very roughly to blue, green, and red colors, respectively. The first stopband 32 of filter 14 will substantially divide cone frequency band 34*a* for the blue cones in half, passing only frequencies in a higher frequency portion 36*a* of cone frequency band 34*a* detectable by blue cones and below about 450 nanometers. In contrast, the stopband 32 of filter 16 will end at approximately 450 nanometers thereby passing frequencies only in the lower frequency portion 36*b* of the cone frequency band 34*a* detectable by the blue cones for frequencies above 450 nanometers. Accordingly, frequencies in the upper and lower portions of cone frequency band 34 are provided to different eyes.

The passband 30 of filter 16 passes the cone frequency bands 34*b* and 34*c* completely whereas the second stopband 32 of filter 14 truncates a small portion 38 of the upper frequencies of cone frequency band 34*c* for the red cone. This truncation provides improved color balance between the left and right eyes when viewing a white scene, thus reducing the tendency of the brain to reject possibly clashing color signals being received through the left and right eye.

Ideally, the difference in color of a broadband light spectrum 26 approximating daylight (e.g. defined as the CIE Standard Illuminant D65) perceived through the left filter 14 and right filter 16 will be similar, having a CIEDE2000 color difference in the LAB color space $\Delta E$ close to 2.3, preferably less than eight, and in general as close to zero as possible. The result is a set of LMS tristimulus values 40*a* and 40*b* received by the left and right eyes for white light that provide roughly balanced color perception. Alternatively, this balance may be provided with respect to other "white" spectra such as other white standards or according to standard light sources such as incandescent bulbs or the like.

Consider now the processing of image spectra 27 representing a metamer with respect to the image spectra 42. In this example, the image spectra 27 (provided identically to the left and right eye as spectra 27*a* and 27*b*) provides a feature within the cone frequency band 34*a* that is processed differently by the filters 14 and 16. Specifically, the spectrum 27 provides relatively greater response in higher frequency portion 36*a* of the blue cone than in lower frequency portion 36*b* of the blue cone. Accordingly, LMS tristimulus values 40'*a* from the image spectra 27*a* for the left eye will show much higher value for the blue cone then the LMS tristimulus values 40'*b* for image spectra 27*b*, while the LMS tristimulus values 40'*a* for the green and red cones will be approximately the same as the LMS tristimulus values 40'*b* for the green and red cones.

This difference in LMS tristimulus values received by the left and right eye for one cone provides new information to the brain keyed to the receipt of the differing LMS tristimulus values at the left or right eye. By minimizing other inconsistencies between the LMS tristimulus values, the inventors have determined that the inconsistency in LMS tristimulus values for one cone can be perceptively interpreted (that is without conscious effort) as a meta-color distinct from the colors represented by either LMS tristimulus values 40'*a* or 40'*b* when viewed through both eyes.

Consider now, for example, image spectra 27 representing a metamer with respect to the image spectra 42 as received by the filters 14 and 16 having a feature in the cone frequency band 34*a* of the blue cone with higher energy content in the lower frequency portion 36*b* of cone frequency band 34*a* of the blue cone compared to energy in the higher frequency portion 36*a* of the cone frequency band 34*a* of the blue cone. This spectrum 42 may provide the same tristimulus values as spectrum 27 in the absence of filtration. However, after filtration by filters 14 and 16, this spectrum 42 will produce LMS tristimulus values 44*a* having a lower tristimulus value for the blue cone in the left eye when compared to tristimulus values 44*b* for the blue cone perceived by the right eye.

The inventors have determined that, the user may readily discriminate between the two spectra 27 and 42 when placed side-by-side. That is, the brain can distinguish spectra that would otherwise be metamers under normal (unfiltered) viewing conditions. As such, the invention operates to effectively simulate vision with an extra cone in (e.g. four cones or tetrachromacy) in each eye.

By using filters that likewise split the other cone frequency bands 34*b* and 34*c*, the inventors predict that up to six cones can be simulated, possibly more with a combination of spatial and temporal multiplexing. It will be appreciated that when only four cones are simulated, different cone frequency bands 34*b* or 34*c* of the green or red cones, in contrast to the cone frequency band 34*a* of the blue cone, may be selected to be split by the filters 14 and 16.

The particular filters 14 and 16 may, for example, be individual or stacks of dielectric filters having thin-film dielectric layers to produce the desired transmission spectra. In one embodiment alternating layers of silicon dioxide ($SiO_2$) and tantalum pentoxide ($Ta_2O_5$) may be deposited on N-BK7 optical glass to produce the desired filter characteristics. Ideally the filters are designed to have low angular sensitivity.

Generally, it will be appreciated that the invention maps additional color information through the eyes to the brain while remaining within the natural tricolor perception space of each eye provided by S, M, L cone sensitivities. It follows that this technique can also be used to with two conventional tricolor displays, for example LCD, CRT, or plasma displays, one for each eye, to similarly augment to the visual experience.

The different LMS tristimulus values 44*a* and LMS tristimulus values 44*b* may refer to actual cone responses in the retina related to the LMS cones (L for long, M for medium, S for short). Practically, however, and as used in this application and the claims, LMS tristimulus values 44 should be understood to refer interchangeably to any commonly used color perception space including but not limited to XYZ space, RGB space, LAB space and the like each of which provide proxies for LMS tristimulus values 44 that are difficult to measure directly.

As is generally understood in the art, XYZ is a space that was developed to capture the perceptual effect of LMS tristimulus values 44, describes the color humans can see, and is based off empirically derived data from experiments performed the 1930s. The Y value in XYZ corresponds to the luminance (brightness) of a given color. X and Z describe the hue. RGB is a linear transformation from the XYZ space that describes colors in the familiar basis of red, green, and blue, and is commonly used in electronic devices. LAB is a nonlinear transformation from XYZ space, and was developed to be perceptually uniform so that equidistant points in different regions of the color space correspond to an equivalent measure of a color difference (this is not the case in RGB, for example). L is luminance, and A and B describe the hue.

Figure 3:
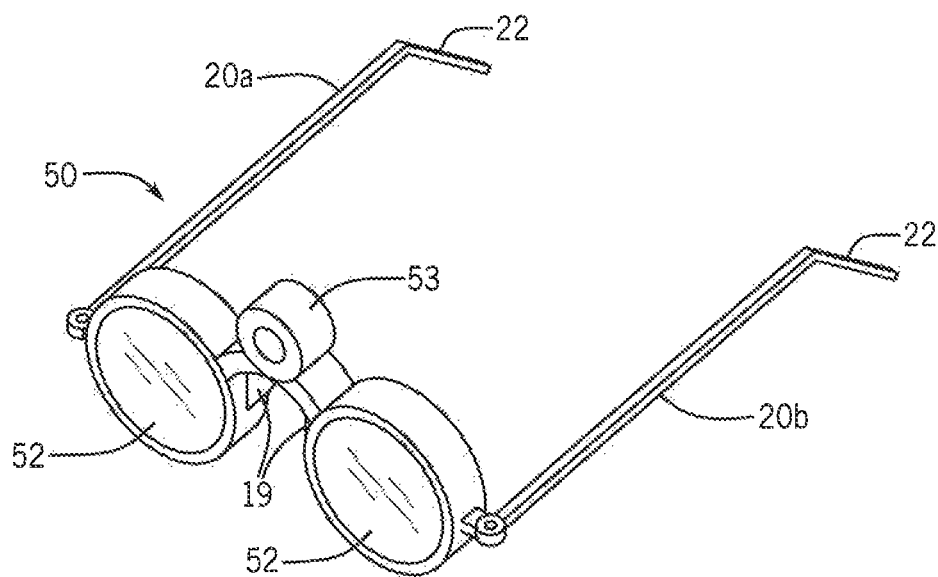
FIG. 3 is a figure similar to that of FIG. 2 showing a glasses frame supporting multispectral camera and tricolor displays in a second embodiment.

Referring now to FIG. 3, an alternative glasses frame 50 may provide for a support structure similar to glasses frame 10 described above while replacing filters 14 and 16 with tricolor backlit LCD displays 52 of conventional design. In this case, the bridge 18 of the frame 50 may support a multispectral camera 54 providing more than three different color measurements at a variety of pixel locations. Multispectral camera as used herein refers to a camera that can discriminate among and make measurements in more than three different frequency ranges using filters, or dispersive elements such as prisms or gratings to obtain additional spectral information. These ranges may cover a range of human vision with greater discrimination or may extend outside of that range.

Figure 4:
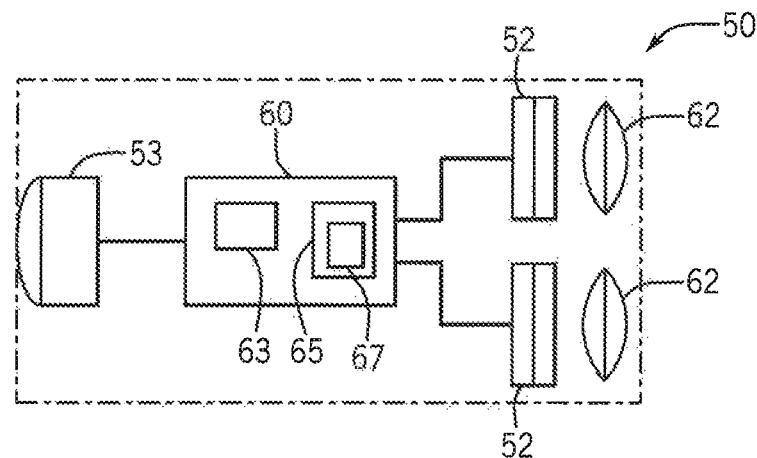
FIG. 4 is a block diagram of the components of the multispectral camera and tricolor displays of the second embodiment of FIG. 3.

Referring also to FIG. 4, the multispectral camera 53 may provide signals representing multispectral pixel data over two dimensions to an internal microcontroller 60. The microcontroller provides a processor 63 communicating with a memory 65 holding a stored program 67 operating as will be described below. Outputs from the microcontroller 60 are communicated to each of the backlit tricolor displays 52 which provide lenses 62 to allow viewing of the displays 52 by the eyes when in close proximity in the frame 50. This viewing allows each eye to view only a single one of the displays 52.

Figure 5:
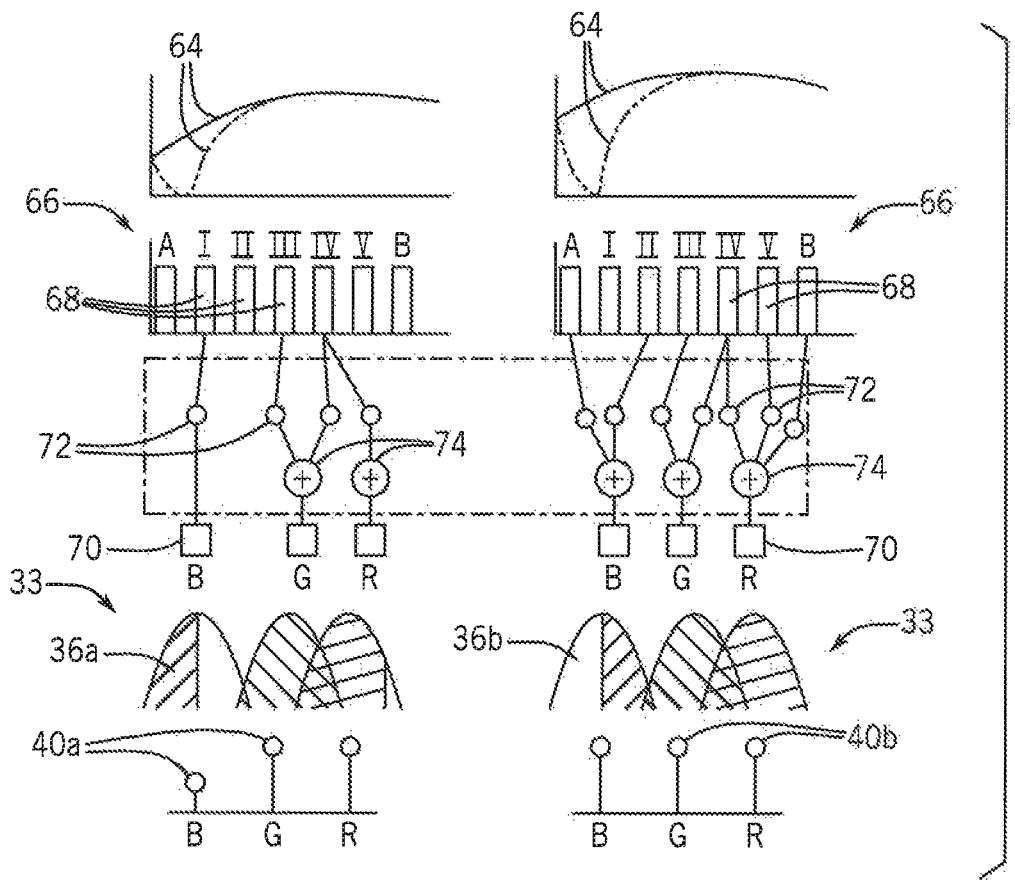
FIG. 5 is a figure similar to FIG. 2 showing several light spectra as processed by the multispectral camera and processing circuitry of FIG. 4.

Referring now to FIG. 5, multi-spectral data 64 received by the camera 53 is processed to flexibly map distinct multispectral measurements 68 (five in this example labeled I-V) to the three blue, green, red channels of the tricolor displays 52 using a camera transfer function 66. In this example, the invention provides the human eye with greater frequency discrimination. The camera transfer function 66 differs for the displays 52 of the left and right eye to implement a system similar to that provided by the filters described above. A camera transfer function 66 may be flexibly implemented by providing for each spectral measurement 68 a weighting indicated by multiplier blocks 72 and then summing these weighted values indicated by addition blocks 74 to produce outputs to drive the light emitter 70 associated with each color channel of the tricolor displays 52. In this example, a multispectral measurement I, positioned in higher frequency portion 36a of the blue cone, is used to provide a signal to the blue tricolor light emitter 70 for the left eye. In contrast, a second multispectral measurement II corresponding to lower frequency portion 36b of the blue cone is used to provide light to the blue tricolor light emitter 70 for the right eye. In this way, different LMS tristimulus values 40a and 40b are generated for the left and right eye respectively for materials having a spectrum, for example, similar to spectrum 27 or 42 shown in FIG. 2.

It will be appreciated that this mapping may also be used to map multispectral measurements A and B at frequencies outside the range of normal human vision into the light emitters 70, for example, taking ultraviolet light at multispectral measurement A and mapping it to the blue tricolor light emitter 70 only for one eye and not the other, or taking infrared light at multispectral measurement B and mapping it to the red tricolor light emitter 70 for only the other eye and not the other. In this way, light components outside of the range of normal human vision can be mapped the human vision range using meta-colors so as to minimize interference with color rendition for colors within the range of human vision.

It will be appreciated that the camera 53 need not be mounted on the frames 50 but that the system may be used for remote monitoring of hyperspectral information, for example, in a survey aircraft or the like with a remotely located camera communicating with glasses mounted displays 52.

Figure 6:
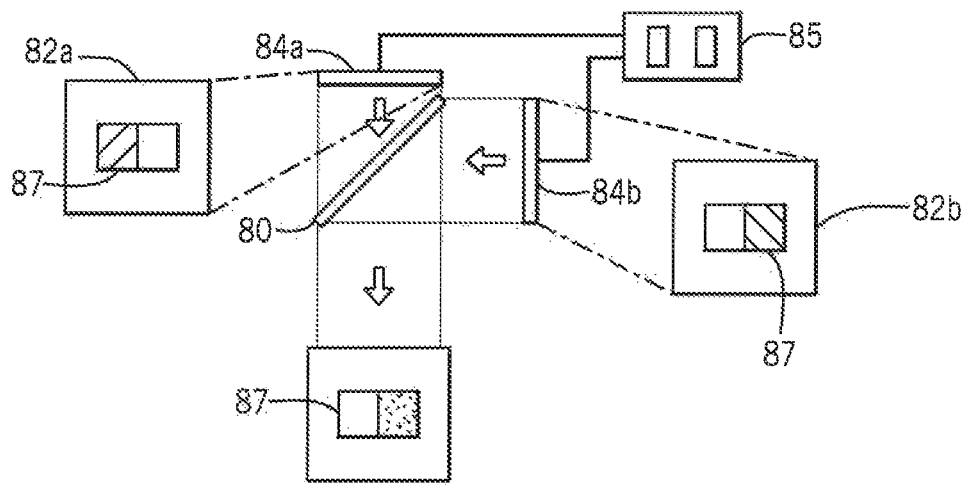
FIG. 6 is a block diagram of a display system for producing meta-colors discernible through the present invention.

Referring now to FIG. 6, the invention further provides a method of creating a metameric display that can produce metamers distinguishable by the present invention. In one embodiment, a beam splitter 80 is used to combine a first image 82a from a first display technology 84a superimposed on a second image 82b from a second display technology 84b. The first and second display technologies 84a and 84b are selected to provide for different spectral renditions of the colors blue, green, and red, for example, resulting from different phosphors or the use of phosphors versus filters, different filter types, or different light emitter designs such as different LEDs. Each of the first and second display technologies 84a and 84b may be color balanced with respect to each other to render approximately identical color rendition to the naked human eye for identical RGB input values. In one example, the images 82a and 82b may provide portions of a colored rectangle 87 generated, for example, by a controller computer 85. Specifically, image 82a may provide a left portion of the rectangle 87 and image 82b may provide the right portion of the rectangle 84 both with the same perceived color to the naked human eye but with different spectral qualities. These two portions of the rectangle 87 are combined by the beam splitter to produce a rectangle 87 apparently having uniform color to the naked eye but in fact rendering that color with two different spectra as can be distinguished by present invention's ability to break metamers by implementing additional color sensitivity beyond that of normal human vision.

Figure 7:
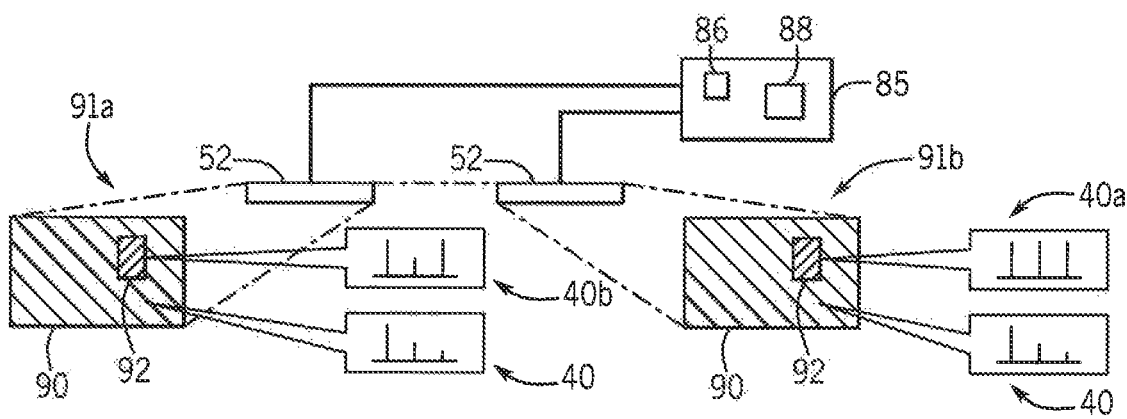
FIG. 7 is a block diagram of a display system generating meta-colors from synthetic images.

Referring to FIG. 7, it will be appreciated that meta-colors of the present invention may be rendered in a synthetic image generated on conventional tricolor displays. For example, the controller computer 85 having a processor 86 may execute a program 88 for the generation of different images for separate displays 52 for the left and right eye, these displays 52 for example, as held in the frame 50 described above with respect to FIG. 3. In a normally colored portion 90 of the two images, regular colors may be produced by providing identical LMS tristimulus values 40 through the red, green, and blue pixel elements of the displays 52. In a meta-color region 92 however, different LMS tristimulus values 40a and 40b for given pixels may be provided to the left and right eye respectively producing the experience of the meta-color. In this way three-color, binocular displays can convey additional "color" information beyond that normally perceivable by the human eye. Such colors may be used, for example, to denote particular information of interest, for example, in the form of visual underlining or the like.

The ability of the present invention to "break" metamers into visually distinguishable colors may be useful, for example, in the detection of camouflage in military operations or forgeries in art or money or the like. In both cases, this utility is derived from an expectation that the camouflage or forgeries may be created using metamers that are not distinguishable by the naked eye but could be distinguished by the present invention. More generally, ability to provide for finer color discrimination or a wider range of frequency sensitivity may be useful in medicine or in geology and agriculture where it may provide additional information about a visual scene that otherwise might not be perceived. The present invention is also a useful for situations where additional visual information needs to be conveyed to the human brain through the limited color channels of the eye and brain.

It will be appreciated that the present invention may also be implemented, for example, with shutter glasses that selectively expose different eyes to light, and an illumination source that provides different spectra of light to a viewed object synchronized to the shutter glass openings to implement the technique described above.

Figure 8:
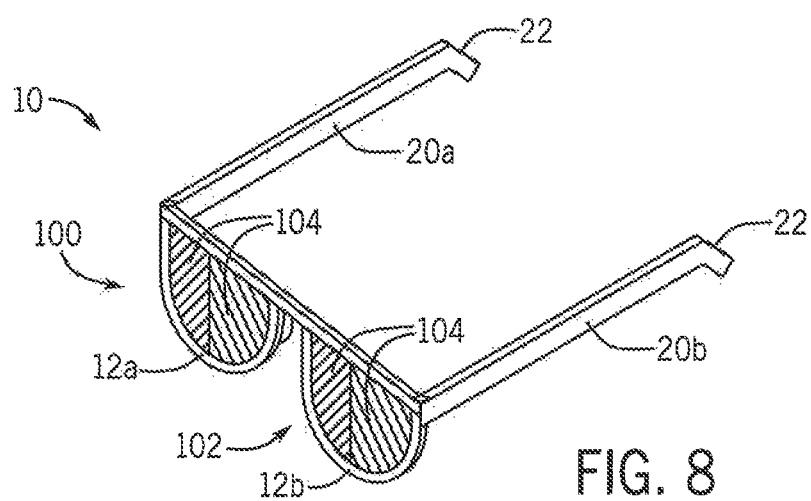
FIG. 8 is a figure similar to that of FIG. 1 showing a split filter system that can tailor the sensitivity of the filters to particular spatial regions or provide additional time encoded information by the user tipping his or her head.

Referring now to FIG. 8, a glasses frame 10 may provide lens rims 12a and 12b holding corresponding split filters 100, and 102 to be positioned in front of a wearer's left and/or right eye respectively. Each filter 100 and 102 may provide for two portions 104 having different filter components, for example, the different portions 104 implementing different of the filters 14 and 16 discussed above with respect to FIG. 1. The portions 104 may divide the filters 100 and 102 into left and right halves respectively, as shown, to affect the user's left and right side fields of vision, or may divide the filters 100 and 102 into upper and lower halves (not shown) in the manner of conventional bifocals dividing the user's field of view into upper and lower portions.

Figure 9A:
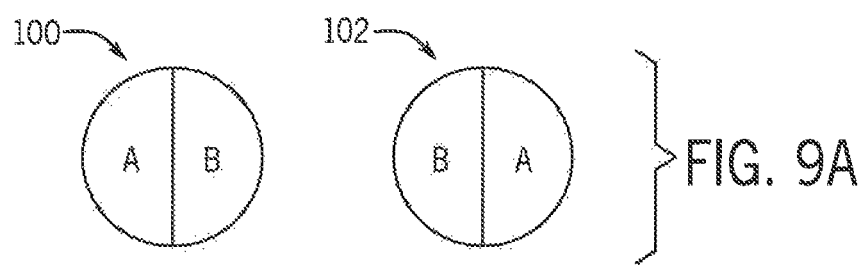
FIGS. 9a-9c is a figure showing various filter combinations that may be implemented in the embodiment of FIG. 8.

Referring now to FIG. 9a, in one embodiment filter type "A", for example corresponding to filter 16 of FIG. 1, and filter type "B", for example corresponding to filter 14 of FIG. 1, may be positioned with A on the left and B on the right (with respect to the viewer) for filter 100 and with B on the left and A on the right for filter 102. In this way, a slight tipping of the user's head back and forth may bring an object of interest into view successively through the left and right side of each of the filters 100 and 102 to change the particular eye receiving the different LMS tristimulus values 40a and 40b (for example discussed with respect to FIG. 2). Again, each eye sees different image spectra, but the differences are flipped as the user moves his or her head reinforcing the effect of the meta-color.

Figure 9B:
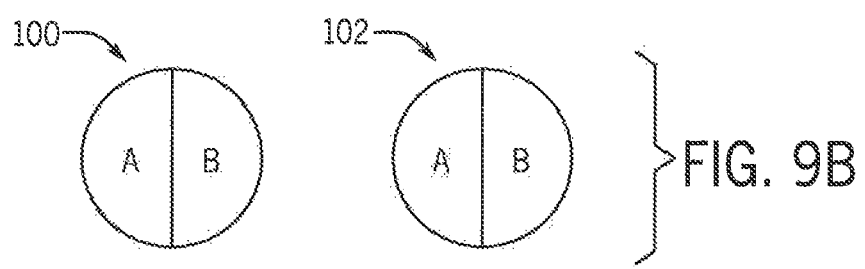

Alternatively, as shown in FIG. 9b, both filters 100 and 102 may have filter portion with A on the left and B on the right (or vice versa) to allow movement of the head back and forth to provide a time varying filtration conveying the meta-colors solely with respect to time variation and not with respect to the different eyes receiving a signal. The result is meta-colors invoked by a changing image spectrum with time in contrast to meta-colors invoke by simultaneous viewing of different image spectra with different eyes.

Figure 9C:
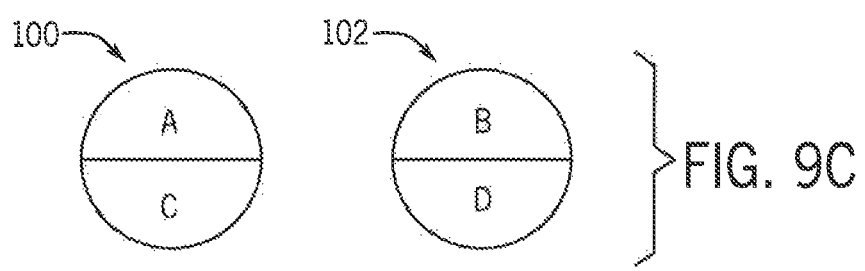

Referring now to FIG. 9c in an alternative embodiment, the portions 104 may be separated along a horizontal axis and may, for example, provide in upper portions 104 filters type A and type B as discussed above on a respective the filters 100 and 102. The lower portions 104, however of filters 100 and 102 may provide for filters type C and D respectively where filters type C and D differ from filters type A and B. For example, filters type C and D may each transmit different parts of cone frequency band 34b or 34c (shown in FIG. 2) as opposed to cone frequency band 34a divided by filter types A and B.

In this embodiment, different meta-colors may be revealed in the upper and lower portions of the user's field of view. Alternatively, by a head nodding, a time changing filtration can be provided conveying the meta-colors both the time domain as spectral shifts with respect to time and in the spatial domain as spectral shifts between two different eyes.

Figure 10:
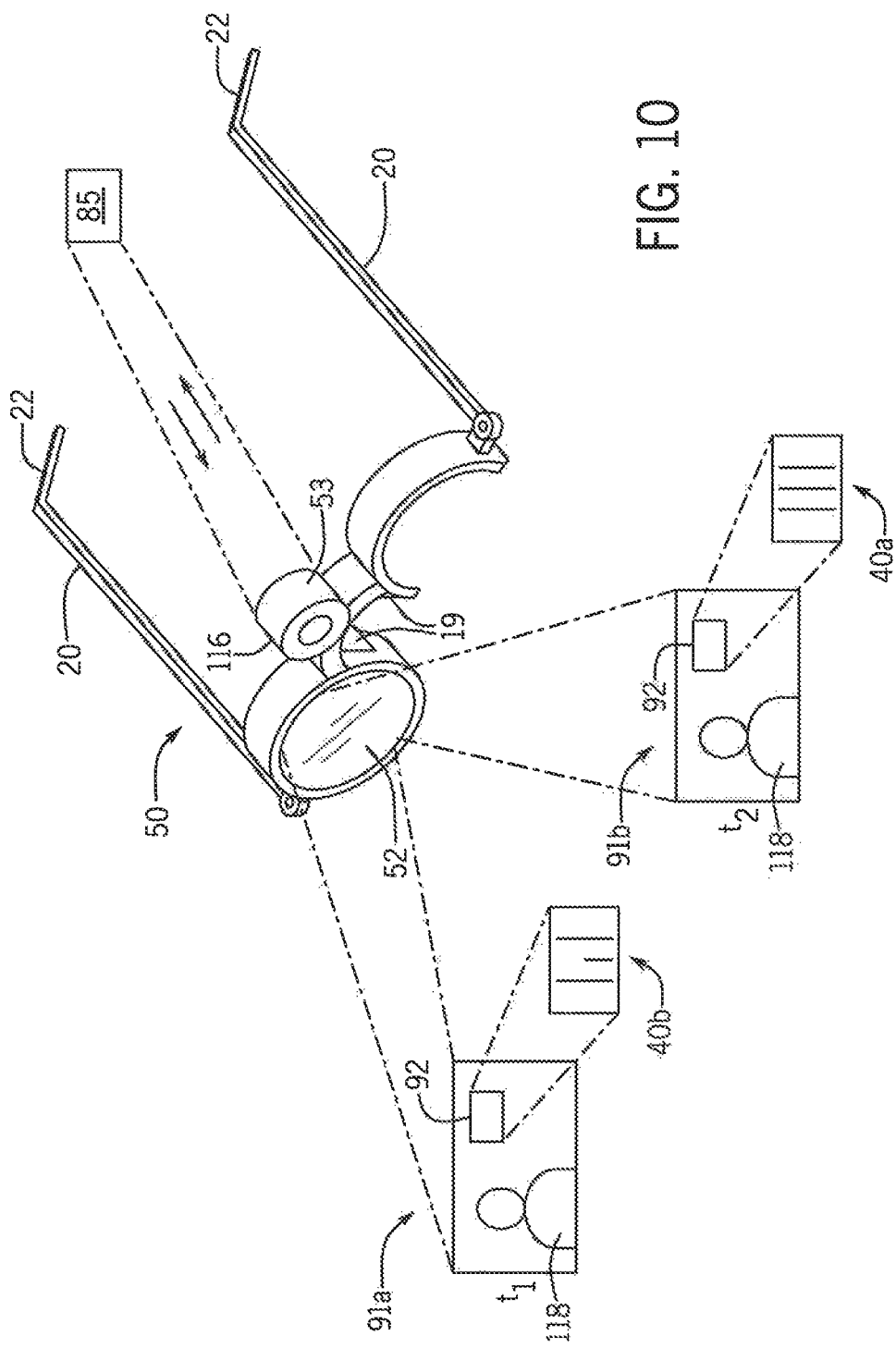
FIG. 10 is a figure similar to that of FIG. 3 showing an electronic display version of the invention in monocle form providing time-multiplexed filter changes for generating the meta-color.

Referring now to FIG. 10, it will be appreciated that this time series mapping of the meta-colors may be performed electronically either in a binocular or monocular implementation using a LCD display 52, for example, receiving data wirelessly through wireless receiver 116 from computer 85. The computer 85 may sequentially send images 91a and 91b to the display 52 to encode the differences between different LMS tristimulus values 40a and 40b in sequential times t1 and t2 rather than as divided between the left and right eyes. This version may also be implemented in a binocular version simply by adding a second LCD display 52 for the left eye per FIG. 3. The LCD display 52 may either be directly viewed by the individual or may be viewed through a beam splitter to superimpose an image of the LCD display 52 on the user's regular visual field in the manner of augmented reality.

Referring still to FIG. 10, a camera 53 may also communicate wirelessly to the computer 85 to provide a real-time image 118 of what would normally be perceived by an individual wearing the frame 50 that can be used to create an augmented composite of the real-time image 118 with generated meta-colors for example as indicated in regions 92. For example, meta-colors may be imposed on objects in the image 118 to track those objects and create an additional dimension of information about the reality around the user.

It will be appreciated that information displayed to the user may be light that is directly filtered by filters or light that is processed through a signal chain including a camera, computer, and electronic display to implement the filters electronically. "Electronic display" may generally include LCD type displays as well as projectors such as micromirror arrays and other display technologies.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

Multispectral is a subset of hyperspectral as used herein hyperspectral cameras are also multispectral cameras. The term "eyepiece" should be broadly understood to include fixtures intended and adapted to be positioned in front an eye for providing or modifying image viewed by the eye including optical filters, electronic displays viewable by a single eye, contact lenses and the like.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. A vision augmentation system comprising:
   a first eyepiece providing a first representation of an image having spatially varying different regions with different spectral characteristics to only a first eye of a viewer, the first representation having a metacolor region presenting spatially varying LMS tristimulus values being a first function of the spectral characteristics over a first spectral range;
   a second eyepiece providing a second representation of the image having spatially varying different regions with different spectral characteristics to only a second eye of the viewer, the second representation presenting corresponding spatially varying LMS tristimulus values being a second function of the spectral characteristics different from the first function over the first spectral range in the metacolor regions so that the first eye and second eye receive different representations of the image having different varying LMS tristimulus values based respectively on different functions of the spectral characteristics over the first spectral range;
   wherein the first and second representations also present to both the first and second eye of the viewer at least one spatially varying LMS tristimulus values that share a substantially identical function of the spectral characteristics over a second spectral range different from the first spectral range in regions outside the metacolor region.

2. The vision augmentation system of claim 1 wherein the first eyepiece is positionable in front of a viewer's first eye and the second eyepiece is positioned in front of a viewer's second eye.

3. The vision augmentation system of claim 1 wherein the first eyepiece is positioned in front of a first portion of a field of view of a viewer's eye and the second eyepiece is positionable in front of a second portion of the field of view of the viewer's eye.

4. The vision augmentation system of claim 1 wherein the first and second functions provide different eyes with different stimuli to different frequencies within two ranges of a frequency band of one cone type in a human eye.

5. The vision augmentation system of claim 4 wherein the first and second functions are selected to provide similar color perception of at least one of daylight and incandescent light.

6. The vision augmentation system of claim 1 wherein the first and second eyepiece comprise respective first and second optical filters.

7. The vision augmentation system of claim 6 wherein the first filter preferentially passes a lower half of one frequency band of a one cone type and the second filter preferentially passes an upper half of the frequency band of the one cone type.

8. The vision augmentation system of claim 7 wherein the one cone type is an S cone.

9. The vision augmentation system of claim 6 wherein the eyepieces are supported by glasses-type frame adapted to fit over the eyes and be supported by a bridge on a person's nose and earpieces on a person's ears.

10. The vision augmentation system of claim 6 wherein the first filter and second filter unequally partition one or more frequency bands of multiple cone types.

11. The vision augmentation system of claim 1 wherein the first and second representations simulate at least four different color channels in the human eye.

12. The vision augmentation system of claim 1 further including an electronic computer generating image data providing the first representation of the spatially varying different regions with different spectral characteristics and the second representation of the spatially varying different regions with different spectral characteristics and wherein the first and second eyepieces receive light from tricolor displays.

13. The vision augmentation system of claim 12 wherein the electronic computer processes a signal from a camera to provide at least a portion of the image having spatially varying different regions with different spectral characteristics.

14. A vision augmentation system comprising:
   at least one tricolor display providing a representation of an image having spatially varying different regions with different spectral characteristics to a viewer;
   an electronic computer communicating with the at least one tricolor display and executing a stored program to provide to the at least one tricolor display:
   (a) a first representation of the image having spatially varying different regions with different spectral characteristics, the first representation of the image having a metacolor region presenting spatially varying LMS tristimulus values being a first function of the spectral characteristics over a first spectral range viewable by only a first eye of the viewer; and
   (b) a second representation of the image having spatially varying different regions with different spectral characteristics, the second representation of the image presenting corresponding spatially varying LMS tristimulus values being a second function of the spectral characteristics different from the first function over the first spectral range in the metacolor regions viewable only by a second eye of the viewer so that the first eye and second eye receive different representations of the image having different varying LMS tristimulus values based respectively on different functions of the spectral characteristics over the first spectral range;
   wherein the first and second representations also present to both the first and second eye of the viewer at least one spatially varying LMS tristimulus value that share a substantially identical function of the spectral characteristics over a second spectral range different from the first spectral range in regions outside the metacolor region.

15. The vision augmentation system of claim 14 wherein the at least one tricolor display provides independent portions positionable for viewing exclusively by each of left and right eyes of the viewer and wherein the first and second representations of the image are presented simultaneously to the left and right eye through the independent portions.

16. The vision augmentation system of claim 14 wherein the first and second representations of the image are presented sequentially to at least one eye of the viewer.

17. The vision augmentation system of claim 14 further including a camera for acquiring an image having multiple pixels each describing at least one frequency value being outside of a range of human vision and wherein the electronic computer processes a signal from the camera to map the frequency value outside of a range of human vision to produce different LMS tristimulus values in the first and second representations of the image.

18. A method of vision augmentation using a first eyepiece providing a first representation of an image having spatially varying different regions with different spectral characteristics to only a first eye of a viewer, the first representation having a metacolor region presenting spatially varying LMS tristimulus values being a first function of the spectral characteristics over a first spectral range, and using a second eyepiece providing a second representation of the spatially varying different regions with different spectral characteristics to only a second eye of the viewer, the second representation presenting corresponding spatially varying LMS tristimulus values being a second function of the spectral characteristics different from the first function over the first spectral range in the metacolor regions so that the first eye and second eye receive different representations of the image having different varying LMS tristimulus values based respectively on different functions of the spectral characteristics over the first spectral range, and wherein the first and second representations also present to both the first and second eye of the viewer at least one spatially varying LMS tristimulus values that share a substantially identical function of the spectral characteristics over a second spectral range different from the first spectral range in regions outside the metacolor region, the method comprising the steps of:

(a) receiving a multispectral image;
(b) modifying the multispectral image to provide the first and second representations to the first and second eye respectively.

19. The method of claim 18 wherein the first and second eyepieces are filters modifying the multispectral image.

20. The method of claim 18 wherein the first and second eyepieces are tricolor displays and further including a multispectral camera and a computer executing a stored program to modify the multispectral images.

* * * * *